United States Patent [19]

Lamb et al.

[11] 4,159,637
[45] Jul. 3, 1979

[54] HYDRAULIC TEST TOOL AND METHOD

[75] Inventors: Raymond K. Lamb; Stephen J. Walker, both of Houston, Tex.

[73] Assignee: The Rucker Company, Houston, Tex.

[21] Appl. No.: 857,159

[22] Filed: Dec. 5, 1977

[51] Int. Cl.² ............................................. G01M 3/28
[52] U.S. Cl. .................................................... 73/46
[58] Field of Search .............................. 73/40.5 R, 46

[56] References Cited

U.S. PATENT DOCUMENTS

| | | | |
|---|---|---|---|
| 2,067,499 | 1/1937 | Millmine | 73/46 X |
| 2,334,303 | 11/1943 | Allen et al. | 73/46 |
| 2,478,628 | 8/1949 | Hansen | 73/46 |
| 3,093,996 | 6/1963 | Jones | 73/46 |
| 3,177,703 | 4/1965 | Waters et al. | 73/40.5 R |
| 3,795,138 | 3/1974 | Hasha | 73/46 |
| 3,872,713 | 3/1975 | Dfrey | 73/46 X |
| 3,897,824 | 8/1975 | Fisher | 73/40.5 R X |
| 4,018,276 | 4/1977 | Bode | 73/40.5 R X |

*Primary Examiner*—Richard C. Queisser
*Assistant Examiner*—Joseph W. Roskos
*Attorney, Agent, or Firm*—Fulbright & Jaworski

[57] ABSTRACT

A test tool and a method of testing is disclosed for testing for leaks in apparatus having a bore and a landing surface, such as blowout preventers, wellheads, casing hangers, and the like. The test tool is connected to pipe having a passage therethrough, which has a landing surface for landing on the landing surface of the bore, bypass passages automatically closed on landing and during testing, packing means for effecting a seal in the bore, a pressure relief valve and hydraulic passages communicating with the passage in the pipe, the packing means, and the relief valve which opens at a predetermined pressure. The packing is set either hydraulically, mechanically or by a combination thereof. The packing is set hydraulically by a piston and cylinder which are activated by hydraulic setting pressure in the passages and then hydraulic test pressure is released by the relief valve to the space above the packing for testing the apparatus. When the test tool is set mechanically, the packing is compressed by the weight of the test tool and the pipe into sealing position by downward movement of a portion of the body after landing, the hydraulic testing pressure then assisting and maintaining the seal.

15 Claims, 4 Drawing Figures

HYDRAULIC TEST TOOL AND METHOD

BACKGROUND OF THE INVENTION

There is a need for a test tool and a method for testing blowout preventers, wellheads, casing hangers and the like, which is relatively simple, which can be either weight or mechanically set, hydraulically set or a combination thereof to seal off an area and hydraulic testing pressure then introduced into the cavity being tested preferably through the test tool bore or through a choke or kill line, if necessary or preferred. Such a tool should be capable of being landed on landing surfaces in blowout preventers, wellheads, casing hangers and the like, that is, any apparatus having a landing area, a seal effected and test pressure applied simply, efficiently and inexpensively to the interior of the apparatus so that various connections and seals therein can be readily tested for leaks.

The following U.S. patents illustrate various testing devices for testing blowout preventers, wellhead equipment and the like: Christiensen U.S. Pat. No. 2,540,332; Waters, et al, U.S. Pat. No. 3,177,703; Diodene U.S. Pat. No. 2,951,363; Ilfrey U.S. Pat. No. 3,872,713; and Fisher U.S. Pat. No. 3,897,824. None of these patents, however, disclose or suggest the improved testing tool and methods of the present invention.

SUMMARY OF THE INVENTION

In summary, the present invention is directed to a test tool for and a method of hydraulic testing of apparatus having a bore and a landing surface therein, such as blowout preventers, wellheads, casing hangers and the like, and in which the test tool can be lowered into the apparatus and landed, a seal effected mechanically or hydraulically or a combination thereof, and hydraulic test pressure then applied to the internal space above the seal. Hydraulic setting pressure or the weight of the tool and the string of pipe to which it is connected actuates the packing mechanism to effect the seal and hydraulic testing pressure then assists in maintaining the seal and is applied internally above the packing to the apparatus after sealing for testing the internal space thereof above the packing for leaks and the like. Fluid bypass passages are provided which include valves biased open but operable to close automatically upon landing.

In summary, the method includes lowering the test tool by a string of pipe and landing it on a landing surface in the apparatus, applying hydraulic pressure in the pipe, effecting a seal either by further downward movement of the test tool or by the hydraulic pressure, maintaining or assisting the maintenance of the seal by hydraulic setting pressure, and then providing hydraulic testing pressure through the test tool to the interior of the apparatus or by another source above the seal for test purposes.

Details of the apparatus and method are subsequently set forth.

It is therefore an object of the present invention to provide a test tool for and a method of hydraulic testing of apparatus having a bore and a landing surface area in which hydraulic setting pressure, weight or a combination thereof can be used to effect a seal and hydraulic pressure applied to the interior of the apparatus above the seal simply, efficiently and inexpensively.

A further object of the present invention is to provide a hydraulic test tool which can be connected to pipe and lowered into apparatus having a landing surface, in which a seal can be effected hydraulically by application of hydraulic pressure through the pipe and the tool and after the seal has been effected to the space in the apparatus being tested above the packing.

It is a further object of the present invention to provide a hydraulic test tool which can be connected to and lowered by pipe into apparatus having a landing area, which test tool includes packing means for effecting a seal in the bore of the apparatus, a pressure relief valve and hydraulic passages communicating with the passage in the pipe, the packing means, and the relief valve, so that application of hydraulic pressure in the pipe and in the tool effects a seal of the packing and then hydraulic test pressure is released by the relief valve to the space above the packing for testing the apparatus.

A further object of the present invention is the provision of a hydraulic test tool for testing for leaks in apparatus having a bore and a landing surface in which a seal is effected mechanically simply by the weight of the test tool and string of pipe to which it is attached after landing and then having means for providing hydraulic pressure to the interior of the apparatus above the seal for testing purposes and to the seal for assisting and maintaining the seal.

A further object of the present invention is the provision of such a hydraulic test tool which has bypass passages and valves which are normally open but close automatically on landing and open automatically when removing the test tool and which are operable without mechanical change for testing again.

A further object of the present invention is the provision of a test tool for hydraulic testing of apparatus having a cylindrical bore and a landing surface, such as blowout preventers, wellheads, casing hangers, and the like, which is adapted to be connected to pipe and lowered into the apparatus and landed on the landing surface, which has an annular sleeve like a piston which moves in an annular cylinder and connecting passages for application of hydraulic pressure for setting a packing, has a relief valve communicating with the hydraulic passages so that setting hydraulic pressure can be applied through the pipe, to the tool, and in the hydraulic passages to effect the seal and then testing pressure is released to the relief valve into the interior of the apparatus above the packing.

A further object of the present invention is the provision of a method of testing apparatus having a bore and a landing surface in which a test tool having a cooperating landing surface is lowered by pipe having a passage therethrough, landing the test tool on the landing surface in the apparatus, effecting a seal in the bore of the apparatus, applying hydraulic pressure through the pipe to the tool to either effect a seal, or to assist in effecting the seal, and then above the seal to a relief valve for hydraulic test pressure within the cavity or space thereabove in the apparatus.

Other and further objects, features and advantages of the invention will appear throughout.

DESCRIPTION OF THE PREFERRED EMBODIMENTS

Figure 1:
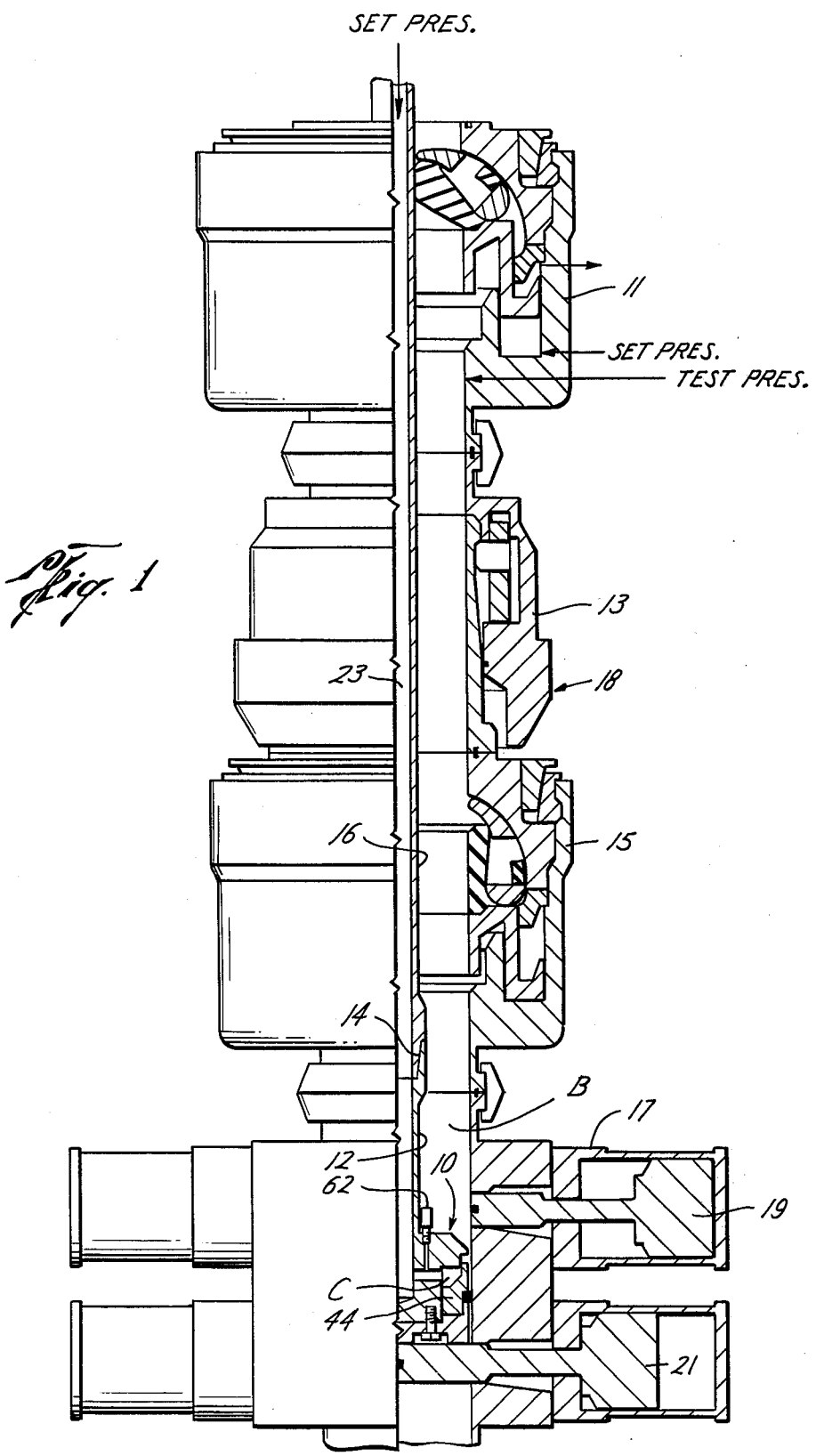
FIG. 1 is an elevational view, partly in section, illustrating apparatus and useful in the method according to the invention of hydraulically testing a blowout preventer stack.
Figure 2:
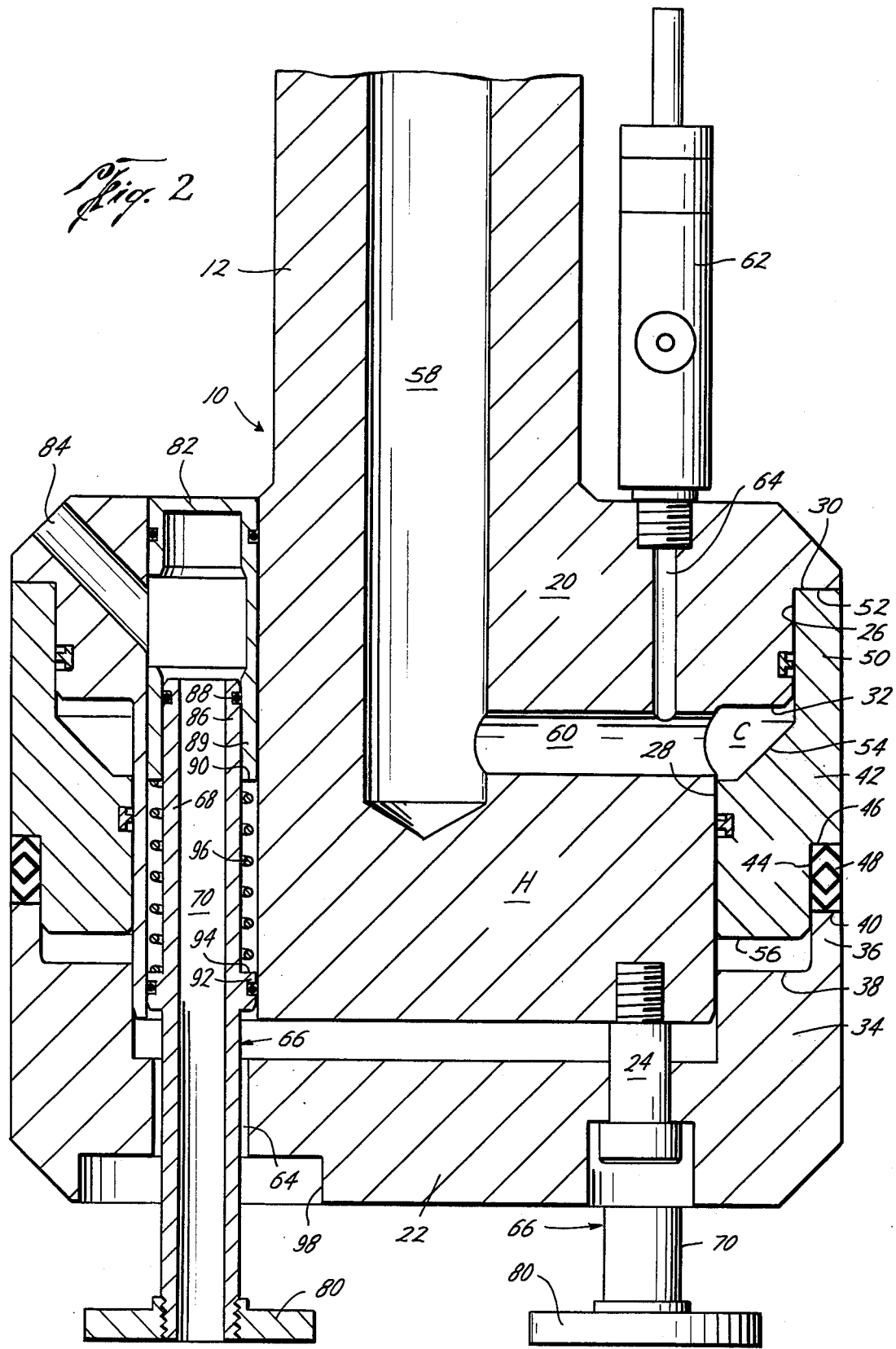
FIG. 2 is an enlarged elevational view, partly in section, illustrating one form of test tool according to the invention and useful in the method of the invention.

Referring now to FIGS. 1 and 2, the test tool is generally designated by the reference numeral 10, and includes the upstanding pipe 12 having means 14 for connection in the usual manner to the string of pipe 16 for lowering it into position in the well apparatus desired to be tested, here shown as the blowout preventer stack generally designated by the reference numeral 18.

Referring particularly to FIG. 2, the test tool 10 includes the housing H which is adapted to fit within the bore B of the blowout preventer 18 (FIG. 1), which housing includes an upper body portion 20 and a lower body portion or cap 22 secured to the upper body portion 20 by the shoulder screws 24 (only one being shown). In the embodiment of FIG. 2, the lower body portion or cap 22 is spaced slightly below the bottom of the upper body portion 20 to permit limited movement of the upper body portion 20 downwardly with respect to the lower body portion or cap 22, upon landing, as will be described in more detail later.

The upper body portion 20 has the first and second reduced diameter body portions 26 and 28, respectively, which are cylindrical in outer configuration and which form the downwardly-facing annular shoulders 30 and 32, respectively.

The lower body portion or cap 22 has the upwardly-extending body portion 34 which fits about a lower portion of the cylindrical surface 28 of the upper body 20 and is provided with the upwardly-extending annular flange 36, which forms the upwardly-facing annular shoulders 38 and 40, respectively.

An annular sleeve 42 is provided which has a reduced diameter portion 44 providing the downwardly-facing annular shoulder 46 which serves as a space for the annular packing 48. Thus, the annular shoulders 40 and 46 face one another and upon movement toward one another compress and expand the packing 48 into sealing engagement with the bore of the particular well apparatus to be tested. The annular packing preferably should be flush with the outer walls of the annular sleeve 42 and the body portion 34 to avoid damage to the packing when moving it in the bore B of the blowout preventer or other apparatus or tools to be tested.

The sleeve 42 has the upwardly-extending annular flange 50 which terminates in the upwardly-facing shoulder 52 which abuts against the downwardly-facing shoulder 30 of the upper body portion 20.

The upper inner surface 54 of the sleeve 42 is spaced from the downwardly-facing shoulder 32 in the upper body portion and the bottom surface 56 of the sleeve 42 is spaced from the upwardly-facing shoulder 38 of the lower body portion or cap 22. This space forms a cylinder C for upward and downward movement of the sleeve 42 which acts as a piston which is moved downwardly on the application of hydraulic pressure to compress the packing 48 or to maintain it compressed or which is moved downwardly by further lowering of the test tool 10 on landing, as will be described in more detail later. This spacing provides for maximum compression of the packing or seal 48.

The upstanding pipe portion 12 has a hydraulic passage 58 which communicates with the passage in the pipe string 16, (FIG. 1), and which also communicates with the passages 60 in the upper body portion 20, only one being shown, which in turn communicates with the cylinder C. Thus, hydraulic pressure applied through the pipe string 16 (FIG. 1) flows through passages 58 and 60 to the cylinder C and causes a downward movement of the sleeve 42 thereby causing the annular shoulder 46 to move toward the annular shoulder or flange 36 when the test tool 10 is landed and compressing the packing 48 to effect the seal.

A relief valve 62 of the type which can be adjusted for a predetermined pressure release is threaded or otherwise secured to the upper body member 20 above the packing 48 and a passage 64 is provided which communicates with the hydraulic passage 60 and with the pressure relief valve 62. As will be described in more detail later, the purpose of the pressure relief valve 62 is to provide high test pressure to the isolated area above the packing after the packing has been set in the particular well apparatus being tested. Any desired pressure relief valve suitable for conditions of use can be used, many of which are readily available on the market and hence no description thereof is deemed necessary or given.

If desired, and preferably, the fluid bypass passages 70 are provided, only one being visible in FIG. 2, although two or more may be used as desired, to bypass liquid in the well when lowering the test tool 10 into the apparatus to test it and when removing it. The valves 66 are yieldingly biased in an open position but operable to close upon landing of the housing on the landing surface. While any type of valves may be used, the valves 66 illustrated are slide valves which include the generally tubular slide valve bodies 68 having the bypass passages 70, which valve bodies 68 project below the bottom portion of cap 22 of the housing 10 and which have the landing feet 80 secured to the projection portions for landing on a landing surface. The upper ends of the passages 70 are closed by the cylindrical and sleeved caps 82 and fluid discharge or entry passages 84 communicate with the upper portion of the passages 70 at the upper end of the body. The discharge passage or outlet port can be drilled in the upper body 20 and here is shown at a 45° angle for discharge above the packing 48 of fluid bypassed when lowering the test tool 10 and entry of the fluid to be bypassed when raising it. It is noted that the upper ends of the passages 70 are enlarged so that the seals 88 on the upper ends 86 of the slide valve bodies 68 do not contact the intersection of the fluid bypass passages 70 and 84.

Figure 4:
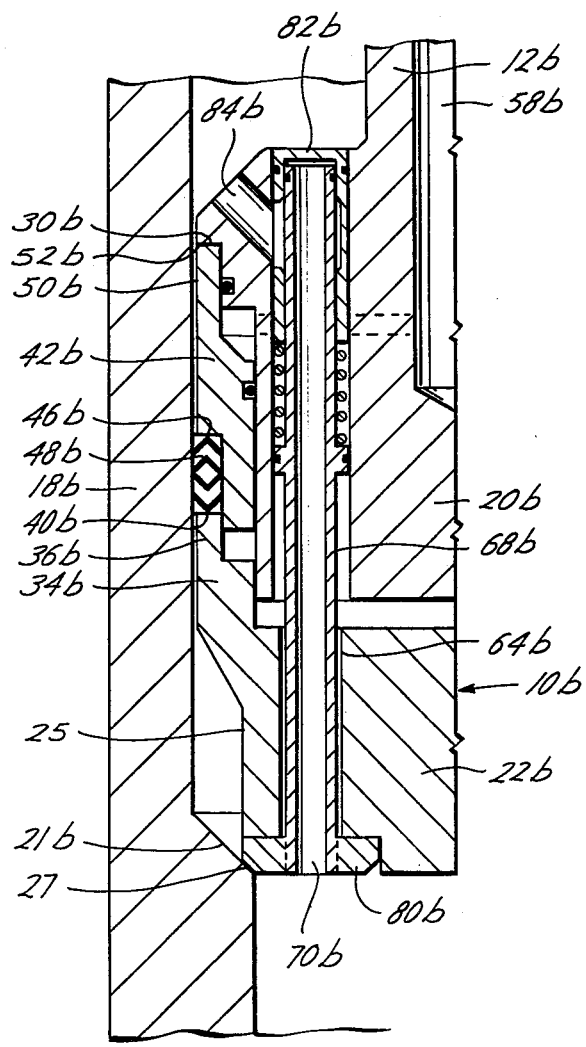
FIG. 4 is a fragmentary, elevational view, in section, illustrating a modified form of test tool for landing on a landing surface in a wellhead and useful in the method of the invention.

The cylindrical caps 82 have depending annular sleeves 89 surrounding the upper ends 86 of the slide valve 68 and provide the downwardly-facing shoulders 90. The annular shoulders 92 are provided on the tubular slide valve bodies 68 intermediate their ends which provide the upwardly-facing annular shoulders 94. The coil springs 96 are provided about the annular slide valve bodies 68 which abut against the oppositely facing shoulders 90 and 94 which springs bias the slide valves downwardly in the positions illustrated in FIG. 2 and therefore in open position, but upon landing the projecting portions and landing feet 80 of the slide valves 66 move upwardly, as illustrated in FIG. 1, into the recessed portions 98 in the lower body portion or cap 22 which receives them. This upward movement, of course, moves the upper ends 86 of the tubular slide valves 66 up into the upper ends of their respective caps 82, such as illustrated in FIG. 4, thereby closing the fluid bypass passages 70 and 84 without further manipulation of the test tool 10. Also, these fluid bypass passages open automatically upon removal of the test tool 10 from its landing surface and the test tool 10 can be reused time and again without structural replacement.

As illustrated in FIG. 2, various seals are provided in addition to the seals 88 on the slide valves' upper ends 86. These include seals on the annular enlargements 92, on the caps 82, on the cylindrical surfaces 26 and 28 of the upper body portion 20, and as needed to provide suitable seals for the test tool.

Referring now to FIG. 1, testing of a blowout preventer stack 18 with the test tool 10 is illustrated. This is a typical blowout preventer stack which includes the upper spherical blowout preventer 11, the connector 13, the lower spherical blowout preventer 15, and the ram-type preventer 17 which includes the shear rams 19 and the pipe rams 21. This is a typical blowout preventer stack, such as marketed by NL Shaffer of Houston, Tex., and since any blowout preventer or blowout preventer stack and associated equipment can be tested which has a landing area, as well as other wellhead equipment and the like, no detailed description is given or deemed necessary of the blowout preventer stack 18.

In FIG. 1 the pipe rams 21 are illustrated in closed position and provide a landing surface for the test tool 10 which is lowered in the bore B by the pipe 16 until landed on the shear rams 21. Any fluid in the bore B is bypassed by the bypass passages 70 and 84, not seen in this view, which are closed on landing. The test tool 10 is then energized by providing a hydraulic setting pressure down through the passage 23 in the pipe 16 which thereby provides setting pressure to the cylinder C to actuate the piston or sleeve 44 to compress the packing 48 and to effect a seal in the bore B of the blowout preventer 18. In this connection it is noted that in the test tool 10 as illustrated in FIG. 1, the seal is completely effected by hydraulic pressure flowing downwardly in the passage 23 in the pipe 16, although the test tool may be the embodiment of FIG. 2 and the seal can be effected mechanically or by a combination of hydraulic and mechanical forces as previously indicated.

The hydraulic seal-setting pressure may be any desired pressure and the pressure relief valve 62 is set at a pressure which is sufficient to effect a seal before permitting pressure to flow past it. While any suitable pressure may be used, it has been found in practice that a setting pressure of 390 p.s.i. is sufficient to effect a seal in a blowout preventer having an 18¾" bore B. After the seal is set, the bore B of the blowout preventer stack 18 is then filled with water and the upper spherical blowout preventer is closed around the pipe 16, as illustrated in FIG. 1, to effect a seal at the upper end. The hydraulic pressure in the passage 23 in pipe 16 is then increased to obtain the desired test pressure. In practice, it has been found satisfactory to increase the pressure through the test tool 10 and out the relief valve 62 to provide a pressure of 5,390 p.s.i. to obtain a desired test pressure of 5,000 p.s.i. in the bore B of the blowout preventer stack 18. The setting pressure is determined by the size of the bore of the blowout preventer or other apparatus or tools being tested, the working pressures at which they are designed to operate, and the compressibility of the packing 48 depending upon its size and composition. The test pressures, of course, will depend upon the operating pressures under which the particular equipment being tested is designed to operate. The setting and test pressures are readily determined by simple experimentation or desing criteria when making the test tool for various uses. In the embodiment of the test tool in FIG. 1, it is only necessary that the pressure relief valve 62 be set so that there is sufficient pressure to first set the seal and then the test pressure is released through the pressure relief valve into the bore or cavity being tested.

After the test has been completed, the pressure is released, the upper spherical blowout preventer opened and the test tool raised and removed from the blowout preventer stack, fluid in the bore B being bypassed through the open bypass passages 70.

Figure 3:
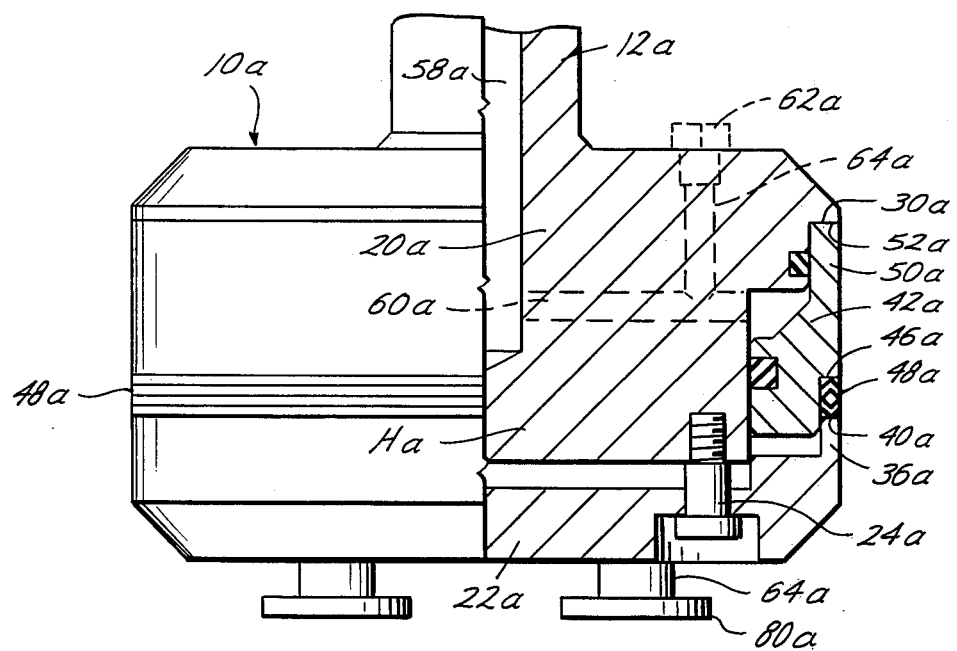
FIG. 3 is a reduced elevational view, in quarter section, illustrating another form of the test tool according to the invention and useful in the method of the invention.

Referring now to FIG. 3, another embodiment of the test tool is illustrated in which the letter "a" has been added to references designating corresponding parts in the previous figures. The embodiment in FIG. 3 is substantially the same as that in FIGS. 1 and 2 except that the internal passages 60 and 64 and relief valve 62 have been eliminated so that the packing 48 effects a seal solely by continued lowering of the test tool 10a which assists in effecting the seal. In this embodiment, the sleeve 42a is not activated, in which event the packing 48 would be compressed into sealing engagement between the downwardly-facing annular shoulder 46a on the sleeve 42a and the upwardly-facing annular flange 40a on the cap 36a by downward movement of the upper body portion 20a toward the landed lower body portion or cap 22a. If desired, the sleeve 42a can be eliminated in this embodiment in which event the body 12a is shortened so that the packing 48a is compressed between the annular shoulders 30a and 40a. Also, either or both of the passages 60a and 64a shown in dotted lines can be included if hydraulic pressure is to be applied through the passage 58a from the passage in the pipe string 23 (FIG. 1) to apply and maintain setting and/or test pressures. If hydraulic setting pressure is not to be applied, then a pipe plug 62a can be used to close the passage 64a.

Referring now to FIG. 4, a modified form of the test tool is illustrated which is particularly suited for landing in wellheads, casing hangers and the like, and in which the reference letter "b" has been added to numerals designating parts corresponding to those of the previous figures. The embodiment illustrated in FIG. 4 is substantially identical to that of FIG. 2 except that the lower portion or cap 22b has a reduced outer diameter portion 23 and a tapered landing area 25 at its lower end, including tapering of the feet 80b of the slide valves 66, so that the test tool 10b can be landed on the landing surface 21b, here shown as a tapered annular shoulder, such as in a casing hanger as illustrated in U.S. Pat. No. 3,897,824, rather than on the upper surface of the pipe rams 21 which serve as a landing surface as illustrated in FIG. 1. All other parts and mode of operation are the same as described in connection with FIGS. 1 and 2 and no further description thereof is given or deemed necessary. All embodiments of the test tool, including FIG. 3, are readily adapted to having landing surfaces on the lower body portion or cap 22, 22a and 22b and landing feet 80 which will cooperate with and land on any desired landing surface in the interior portion of any well apparatus to be tested.

The method of testing apparatus having a bore and a landing surface comprises lowering a test tool having a cooperating landing surface by pipe having a passage therethrough, landing the test tool on the landing surface in the particular apparatus being tested, effecting a seal in the bore of the apparatus, applying hydraulic setting pressure through the pipe to the tool to either effect the seal or to assist in effecting the seal, and above the seal for providing hydraulic test pressure within the cavity or space thereabove in the apparatus.

Preferably, the seal is obtained by providing hydraulic pressure to actuate the sealing mechanism, water is placed in the bore of the apparatus above the seal, the space to be tested is closed off against the pipe, and then a higher hydraulic pressure, the test pressure, is applied through the pipe and out a pressure relief valve which has been set at a predetermined pressure to provide test pressure to the liquid above the seal. The seal can be mechanically effected simply by lowering the test tool after landing to compress a suitable packing or a combination of hydraulic setting and mechanical setting of the packing by applying hydraulic pressure and mechanical force.

Advantageously, the testing tools illustrated in the drawings can be used in the methods of the invention.

The present invention therefore is well suited and adapted to attain the objects and ends and has the advantages and features mentioned as well as others inherent therein.

While presently preferred embodiments of the invention have been given for the purposes of disclosure, changes may be made therein which are within the spirit of the invention as defined by the scope of the appended claims.

What is claimed is:

1. A test tool for hydraulic testing of apparatus having a bore and a landing area comprising,
   a housing adapted to fit within the bore,
   means on the housing for connection to pipe having a passage therethrough for lowering and raising the housing in the bore,
   the housing including a sleeve movable with respect to the housing,
   the housing and sleeve having annularly extending and facing shoulders,
   packing disposed between the shoulders adapted to be compressed and expanded into sealing engagement with the cylindrical bore on movement of the shoulders toward each other,
   means in the housing for applying hydraulic pressure to the sleeve,
   a landing surface on the housing adapted to land on the landing surface in the bore restricting downward movement of the housing after such landing,
   a passage in the housing communicating with the passage in the string of pipe and with the means for applying hydraulic pressure to the sleeve,
   a pressure-relief valve disposed on the housing above the packing operable to open at a pre-determined pressure and being in fluid communication with the passage in the housing,
   whereby the test tool can be lowered in the bore, landed on the landing area in the bore, hydraulic pressure then applied in the passages in the pipe and thus in the housing, a seal effected in the bore by the packing, and hydraulic testing pressure applied to the bore above the packing through the relief valve.

2. The test tool of claim 1 where,
   the seal is effected by application of hydraulic pressure to the sleeve.

3. The test tool of claim 1 where,
   the seal is effected by moving the sleeve downwardly with respect to the housing by limited downward movement of the housing after landing.

4. The test tool of claim 1 where,
   the housing includes a plurality of fluid bypass passages extending from adjacent the bottom to adjacent the top of the housing for bypassing fluid in the bore when the test tool is lowered and raised therein, and
   valve means in the bypass passages operable to close the bypass passages upon landing on the landing area and during testing.

5. The test tool of claim 4 where,
   the valve means have projections extending downwardly from the housing and adapted to contact the landing area in the cylindrical bore,
   downward movement of the housing after landing the projections on the landing area closes the valve means.

6. A test tool for hydraulic testing of apparatus having a cylindrical bore and a landing surface comprising,
   a housing adapted to fit within the cylindrical bore and including an upper body portion having first and second reduced lower diameter portions forming first and second downwardly-facing annular shoulders,
   a bottom body portion at the lower portion of the second reduced diameter portion and having an upwardly-extending first annular flange forming a third annular shoulder facing upwardly,
   an annular sleeve movably disposed about the second reduced diameter portion and having an upwardly-extending second annular flange disposed about the first reduced portion and a third reduced diameter portion movable within the upwardly extending first annular flange, the third reduced diameter portion and the first upwardly-extending annular flange forming spaced annular and facing shoulders,
   the annular sleeve's top and bottom being spaced from the downwardly facing second annular shoulder and an upper portion of the lower body portion, respectively, thereby providing an annular cylinder in which a portion of the annular sleeve moves,
   packing disposed between the facing annular shoulders adapted to be compressed and expanded into sealing engagement with the cylindrical bore on movement of the facing annular shoulders toward each other,
   means on the upper body portion for connection to a pipe having a passage for lowering and raising the housing in the cylindrical bore,
   means in the upper body portion communicating with the passage in the pipe and the annular cylinder for applying hydraulic pressure to the sleeve effective to move the facing annular shoulders toward one another,
   a pressure relief valve disposed at the upper body portion above the packing in fluid communication with the passages in the pipe and the upper body portion, the pressure relief valve being operable to open at a predetermined pressure,
   a landing surface on the housing adapted to land on the landing surface in the bore restricting downward movement of the housing after such landing, whereby the test tool can be lowered in the cylindrical bore, landed on the landing area in the bore, hydraulic pressure applied in the passages, the seal effected in the bore by the packing, and hydraulic testing pressure applied to the bore above the packing through the relief valve.

7. The test tool of claim 6 where, the upper and lower body portions have a plurality of passages extending upwardly from the bottom body portion to the upper body portion above the packing, and, slide valves having portions projecting below the bottom of the bottom member yieldably biased in an open position but operative to close the passages upon landing of the housing on the landing area.

8. The test tool of claim 6 where, the bottom body portion is spaced below and is movably secured to the bottom of the upper body portion permitting limited downward movement of the upper body portion relative to the lower body portion, which movement is effective to move the oppositely facing shoulders toward one another and to compress and expand the packing and thereby effect the seal.

9. The test tool of claim 6 where, the upper and lower body portions have a plurality of passages extending upwardly from the bottom body portion to the upper body portion above the packing, the slide valves having portions projecting below the bottom of the bottom member yieldably biased in an open position but operative to close the passages upon landing of the housing on the landing area, and, the bottom body portion is spaced below and is movably secured to the bottom of the upper body portion permitting limited downward movement of the upper body portion relative to the lower body portion, which movement is effective to move the facing annular shoulders toward one another and to compress and expand the packing and thereby effect the seal.

10. A method of testing apparatus having a bore and a landing surface with a test tool connected to pipe having a passage therethrough, the test tool having a landing surface for landing on the landing surface of the bore, packing for effecting a seal in the bore, hydraulic passages communicating with the passage in the pipe, with the packing and with a relief valve which opens at a predetermined pressure carried by the test tool comprising, lowering the test tool by the pipe in the bore, landing the test tool on the landing surface in the bore and effecting the seal in the bore, applying hydraulic pressure to the passage in the pipe and to the communicating hydraulic passages and thereby to the packing and effecting a seal and through the relief valve to the bore above the packing, then testing the apparatus while under the hydraulic pressure for leaks.

11. The method of claim 10, including adding a liquid to the apparatus after effecting the seal in the bore and before applying the hydraulic pressure.

12. The method of claim 10, where, the seal is initially effected mechanically upon the landing of the test tool on the landing surface of the bore, the hydraulic pressure assisting in maintaining the seal.

13. The method of claim 10, where, the seal is effected mechanically upon the landing of the test tool on the landing surface and by applying hydraulic setting pressure to the packing.

14. The method of claim 10, where, a setting pressure is first applied through the passage in the pipe to set or assist in effecting the seal, and a test pressure higher than the setting pressure is then applied through the pipe to the test tool, to the packing and to the bore above the packing after the seal has been effected.

15. The method of claim 14, including, adding a liquid to the apparatus after effecting the seal and before the test pressure is applied.

* * * * *